April 28, 1953  E. MERCIER ET AL  2,636,510
CHECK VALVE
Filed Feb. 11, 1948  2 SHEETS—SHEET 1
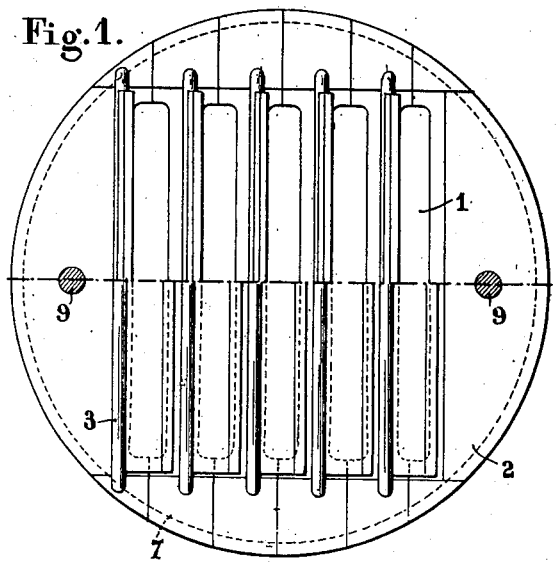
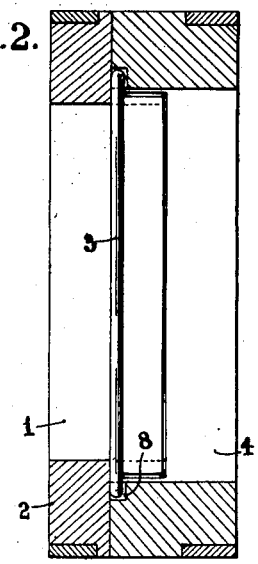
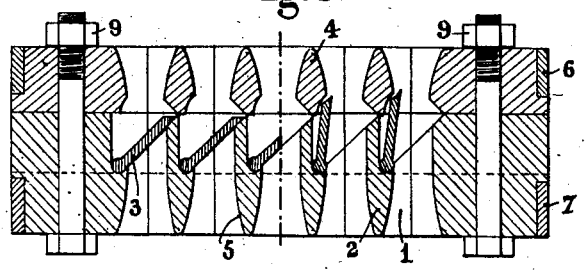
Ernest Mercier & Marcel Ehlinger
INVENTORS
By Corey & Jacobs
Their Attorneys April 28, 1953     E. MERCIER ET AL     2,636,510
CHECK VALVE
Filed Feb. 11, 1948     2 SHEETS—SHEET 2
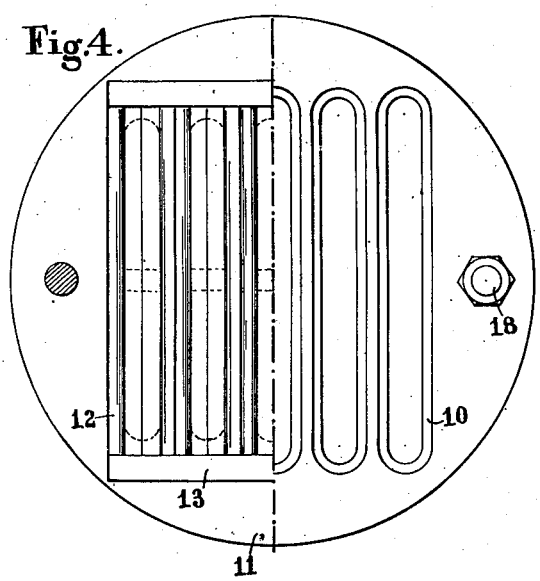
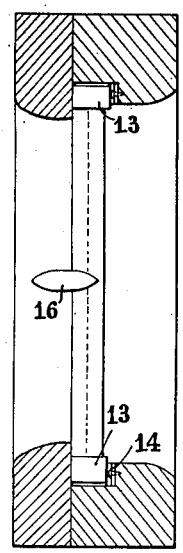
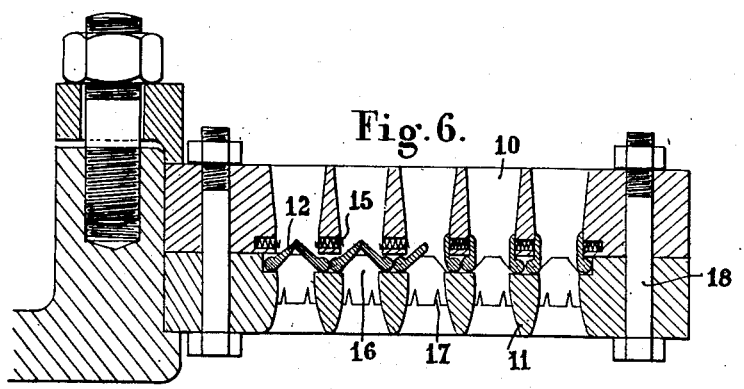
Ernest Mercier & Marcel Ehlinger
INVENTORS
Their Attorneys Patented Apr. 28, 1953

2,636,510

UNITED STATES PATENT OFFICE 2,636,510

CHECK VALVE

Ernest Mercier and Marcel Ehlinger, Paris, France, assignors, by mesne assignments, to Moore, Inc., Atlanta, Ga., a corporation of Georgia Application February 11, 1948, Serial No. 7,564
In France June 23, 1945

Section 1, Public Law 690, August 8, 1946
Patent expires June 23, 1965

2 Claims. (Cl. 137—512.1)

Our prior United States patent application Serial No. 600,390, filed June 19, 1945, now Patent No. 2,576,848, granted November 27, 1951, entitled "Obturator or Valve," relates to check valves for use in machines operated generally by any suitable fluid and comprising a plurality of passageways the cross section of which is in the shape of a converging-diverging nozzle, the flow-controlling member consisting of a thin grate provided with apertures and whose displacement in its own plane at right angles to the axes of the passageways makes it possible to open or close said passageways.

The present invention consists in equipping valves of similar design, in which a plurality of streamlined passageways are provided, with flaps mounted for rocking motion about an axis instead of a slidable grid-like flow-controlling member, the said flaps in their open position standing clear from the streamlined passageways for the fluid.

The invention also relates to various embodiments of the present invention. Thus, in a first embodiment, each passageway has one flap assigned to it whereas in a second embodiment a pair of flaps are assigned to each passageway, which flaps in their closed position engage each other at the movable edges thereof.

According to the invention, the passageways are either formed in the solid material or instead they are provided by the juxtaposition of suitably machined bars firmly pressed together by means of a frame or a hoop.

Figures 1, 2 and 3 are a plan view, a longitudinal section and a cross section respectively of a check valve provided with one single flap per passageway.

Figures 4, 5 and 6 are similar views relating to valves provided with a pair of flaps per passageway.

Referring now to Figures 1, 2 and 3, five passageways have been shown by way of example, which are arranged parallel with one another. Their converging portions are formed in a fluid-intake grid 2 which constitute the common bearing member of the movable flow-controlling members or flaps 3; said flaps are illustrated in their closed position in the left portion of Fig. 3 and the lower half of Fig. 1 and in open position in the right portion of Fig. 3 and the upper half of Fig. 1.

The diverging portion of the passageways is provided in fluid outlet grid.

It has been assumed that the flaps 3 in their closed position are set at an angle of about 45° to the general direction of the nozzle; it is quite obvious that such an angle may be altered and notably have a value of 90°, which is more convenient for manufacturing purposes.

The intake and outlet grids are assumed to be composed on juxtaposed bars machined at their flanks 5 prior to their assembly, which is effected by clamping said bars together with the aid of hoops 6, 7 which are annular in shape in the embodiment illustrated.

Where the valve is e. g. rectangular instead of circular, rectangular frames will be used instead of hoops to clamp the bars.

The flaps are formed with a back rib that extends at either end thereof in trunnions received in notches 8 (see Fig. 2).

The passageways as illustrated have equal lengths that involve the use of similarly shaped flaps. It will be appreciated that the passageways may have unequal lengths so that the area of the valve may be availed of over the whole extent of it.

In assembling the valve of Figs. 1 to 3, the flaps 3 are first assembled with the outlet grid, with their trunnions received in the notches 8. The two grids are then fastened together by means of the bolts 9, so that the trunnions are retained in the notches 8.

The flaps 3 are formed with knife edges at their free ends, and the parts are so arranged that when the flaps are open, the knife edges project slightly into the air stream. Hence, any back flow of fluid catches the projecting knife edges and quickly closes the valve.

The valve is assembled with the aid of bolts 9.

Referring now to Figures 4, 5 and 6, five passageways 10 are represented therein by way of example. The inlet grid 11 is illustrated in the left half of Fig. 4 and the outlet grid in the right half.

The valve as a whole is shown in sectional view in Figures 5 and 6. The flaps 12 are illustrated in their closed position in the left portions of Figs. 4 and 6, and in their open position in the right half of Fig. 6. It will be noted that in the closed position of the flaps the edges of the same are in engagement with each other. A fluid tight joint is secured on the line of engagement between each pair of flaps, and since a way through remains still free at the ends for the fluid, a pair of stop bars 13 are provided which are pressed against the flaps by the pressure of the fluid itself. They are held in engagement with the inlet grid by leaf springs 14.

The flaps in their open position are swung clear by the flow of the fluid to which a streamlined passageway is left. Springs 15 arranged crosswise to the axis of the valve urge the flaps towards their closed position.

In order to make it certain that the flaps are in their correct closed position, that is, symmetric to each other, streamlined stops 16 are also provided in diametrical alignment as shown in Fig. 6. They are kept in position by chiseling as shown at 17.

In assembling the valve of Figs. 4 to 6, the flaps 12 are first assembled with one grid and the two grids are then fastened together by means of bolts 18, thereby retaining the flaps 12 in place.

The valve is assembled with the aid of bolts 18.

The passageways are machined from or cast in the solid. They may be provided by separately machined bars clamped together as shown in Figs. 1 to 3.

The valves can be used with fluids of any kind.

In the preceding examples it has been assumed that the valves are automatic in operation, which means that they are responsive directly to the action of the fluids concerned.

What I claim is:

1. A check valve comprising an inlet grid and and outlet grid, each said grid including a frame and contoured parallel bars crossing said frame, said bars being correspondingly spaced in both grids and being aligned in the two grids and contoured so that the spaces between the bars form a plurality of parallel generally streamlined passages through the grids of converging-diverging section, and one rigid flap member disposed in each of said passages, each said flap member being pivoted along one edge on one of said frames and adjacent one side of said passage and having its free edge sharp, each of said flap members being swingable between an open position in which it lies closely adjacent the proximate bar with said sharp edge facing the outlet end of the valve and projecting slightly into the passage, and a closed position in which its free edge engages a seat on the next bar to block the intervening passage.

2. A valve comprising an inlet grid and an outlet grid, each said grid including a frame and contoured parallel bars crossing said frame, said bars being correspondingly spaced in both grids and being aligned in the two grids and contoured so that the spaces between the bars form a plurality of separate parallel passages through said grids, and one rigid flap member disposed in each of said passages adjacent the middle portion of the length of said passage, each said flap member being pivotally supported on the proximate bar of one of said frames on a pivotal axis disposed adjacent said proximate bar and swingable on said pivotal axis between an open position in which said flap member lies closely adjacent said proximate bar and a closed position in which the outer edge portion of said flap member engages a seat formed on the next bar so that said flap member blocks the intervening passage, each said flap member in said blocking position also engaging a seat in said proximate bar, said flap members in said open position cooperating with the respective proximate bars and with the bars aligned therewith to form contours along the respective adjacent sides of said passages substantially streamlined throughout the length thereof, said next bars and the bars respectively aligned therewith being similarly contoured at the respective opposite sides of said passages, said seats being formed in respective next bars by recesses of restricted depth substantially maintaining the streamlined contour of said opposite sides of said passages.

ERNEST MERCIER.
MARCEL EHLINGER.

References Cited in the file of this patent

UNITED STATES PATENTS

| Number | Name | Date |
| --- | --- | --- |
| 561,688 | Noble | June 9, 1896 |
| 1,428,882 | Dyer | Sept. 12, 1922 |
| 1,599,414 | Huff | Sept. 14, 1926 |
| 2,408,056 | Farmer | Sept. 24, 1946 |

FOREIGN PATENTS

| Number | Country | Date |
| --- | --- | --- |
| 1,726 | Great Britain | of 1915 |
| 13,304 | Great Britain | of 1910 |